United States Patent [19]

Lewis et al.

[11] E Re. 28,624

[45] Reissued Nov. 25, 1975

[54] ARGON COMPRESSED GAS SUPPLY

[75] Inventors: Donald J. Lewis, Troy; Robert J. Bishop, Rochester, both of Mich.

[73] Assignee: Allied Chemical Corporation, New York, N.Y.

[22] Filed: Oct. 15, 1973

[21] Appl. No.: 406,520

Related U.S. Patent Documents

Reissue of:

[64] Patent No.: 3,756,621
Issued: Sept. 4, 1973
Appl. No.: 195,092
Filed: Nov. 3, 1971

[52] U.S. Cl. ..... 280/150 AB; 423/262
[51] Int. Cl. ..... B60r 21/08
[58] Field of Search ..... 280/150 AB; 23/281; 423/262

[56] References Cited

UNITED STATES PATENTS

| | | | |
|---|---|---|---|
| 3,647,393 | 3/1972 | Leising et al. | 23/281 |
| 3,663,036 | 5/1972 | Johnson | 280/150 AB |
| 3,674,059 | 7/1972 | Stephenson | 280/150 AB X |
| 3,723,205 | 3/1973 | Scheffee | 280/150 AB X |

FOREIGN PATENTS OR APPLICATIONS

| | | | |
|---|---|---|---|
| 953,312 | 3/1964 | United Kingdom | 280/150 AB |

*Primary Examiner*—Kenneth H. Betts
*Assistant Examiner*—John P. Silverstrim
*Attorney, Agent, or Firm*—Jonathan Plaut; John P. Kirby, Jr.

[57] ABSTRACT

Storage and supply of argon in a reservoir for inflation of air cushion.

1 Claim, 1 Drawing Figure

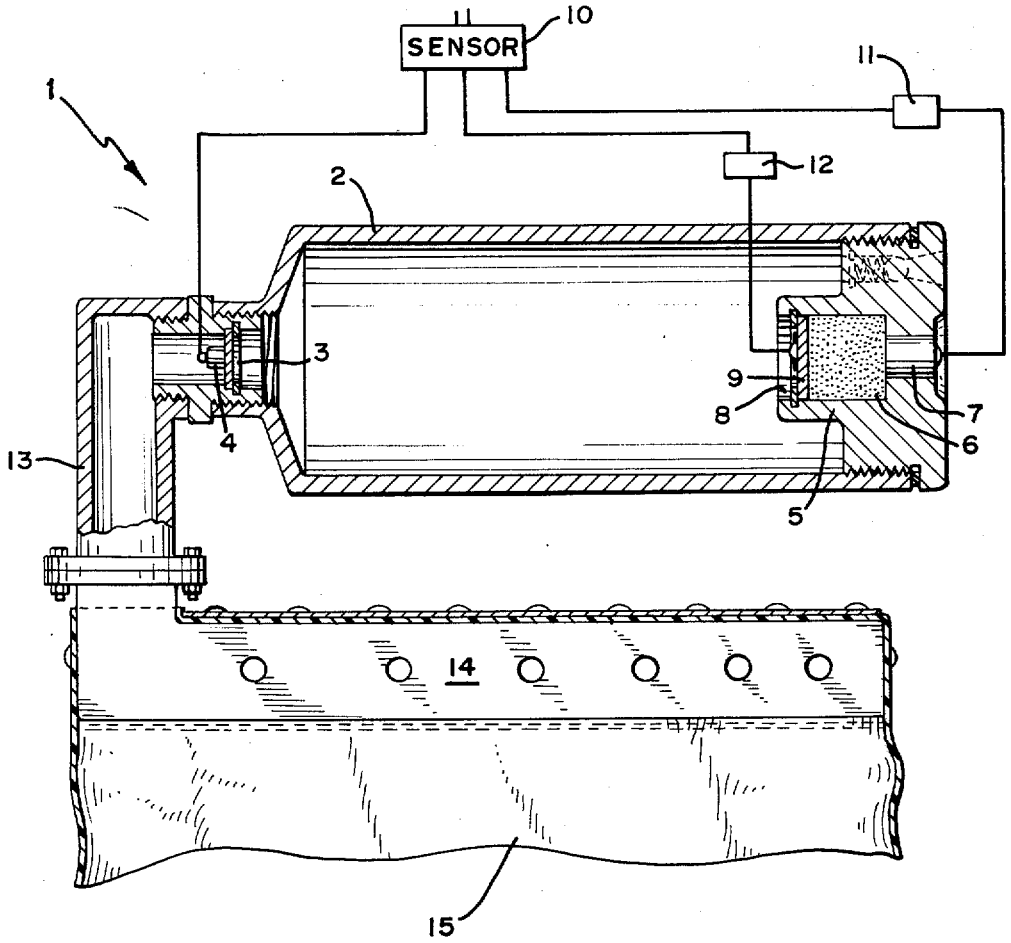
SENSOR
10
11
1
12
2
3
9
8
7
6
4
13
5
14
15

ARGON COMPRESSED GAS SUPPLY

Matter enclosed in heavy brackets [ ] appears in the original patent but forms no part of this reissue specification; matter printed in italics indicates the additions made by reissue.

This invention relates to the introduction of argon compressed gas into a source reservoir, or chamber, from which said gas is supplied to a cushion for occupant, including but not limited to driver protection in an automobile.

BACKGROUND OF THE INVENTION

As is well known in the art, stored compressed gas found in a chamber or reservoir may be utilized to inflate cushion material for protection of an occupant in a moving vehicle, such as an automobile. Such compressed gas may be the only inflating material for the cushion, or may be used in association with augmenting heat and generated gas. In the prior art, such compressed gas is usually compressed air or compressed nitrogen used alone or in association with a gas generated from a combustible source.

Compressed air and compressed nitrogen have specific problems related to their use. For example, air is not inert and when it is compressed to relatively high pressure becomes a source of significant hazard. Although compressed nitrogen is relatively inert, it contributes to the production of nitrogen oxide contaminates, especially when intermixed with gases generated from combustion. In addition, compressed air and compressed nitrogen are of relatively low molecular weight so they have relatively high thermal conductivity as will be discussed in greater detail hereinafter, and further do not contribute as well to a relatively high mass of gas in the cushion when inflating said cushion.

It is an object and advantage of this invention to provide a gas which meets the needs of an inflating gas, without the disadvantages discussed above. Other objects and advantages will become more apparent upon review of the disclosure which follows.

BRIEF DESCRIPTION OF INVENTION

Generally, the invention may be described as the storage and introduction of compressed argon gas into a protective cushion from a gas source.

The invention will now be described in association with the accompanying drawing which shows in the single view an illustrative schematic of a gas cushion system.

DETAILED DESCRIPTION OF INVENTION

In the embodiment of the drawing, shown merely for illustrative purposes, a chamber 2 for storing compressed gas is shown in the gas cushion system 1. Said chamber 2 is normally sealed so that the gas may not escape and a plug 3 is located at one end thereof with a detonator 4 lying thereagainst for rupturing the plug 3 to allow the gas to escape from the chamber 2. The chamber 2 preferably includes a gas generation device 5 which includes a combustible material 6 therein to be ignited by a squib 7. Gas generating from the combustible material 6, which in one embodiment is a poly vinyl composite propellant but may be other materials, emits gas through the orifice 8 at an end of the gas generating assembly 5. Firing of the squib 7, and detonator 4 may be controlled by a sensor device 10, well known in the prior art, for example the sensor of U.S. Pat. Application Ser. No. 117,560, filed Feb. 22, 1971, which is sensitive to a crash condition of a vehicle in which the gas cushion system is mounted. A timer or timers 11 and 12 may be utilized in one embodiment to delay firing of the gas generating device until after the plug 3 is blown by the detonator 4. Alternately, the sequence of blowing of the plug 3 and the disc 9 may be reversed or otherwise altered, as desired. Further details of one embodiment of gas storage and generating device, as described above, may be found in U.S. Application Ser. No. 81,947, filed Sept. 19, 1970.

It is emphasized that the chamber 2 may contain no gas generating device, but merely be a storage cylinder in one embodiment of the invention, but specific advantages accrue from the invention where an augmented gas supply system, i.e., a stored compressed gas augmented by a generated gas, is utilized.

The stored gas in chamber 2 and the generated gas, if it is present, is supplied through the elbow device 13 in one embodiment, to the manifold 14 for distribution into cushion 15 joined to said manifold. The use of elbow structure 13 or the particular manifold structure and the specific cushion device employed (including a single or multiple cushion) is a matter of choice not relevent to the invention. What is shown in the drawing and described above is shown merely for illustrative purposes.

The gas contained in the chamber 2 is compressed argon, preferably in the range of 1,000 to 3,000 psi and in one embodiment 2,350 psi. Argon is inert. Unlike nitrogen or compressed air, argon willl not contribute to the production of nitrous oxide toxic contaminates in the gas, which is especially beneficial where generated gas from combustion materials augments the stored gas. Because of its low thermal conductivity and high molecular weight, the compressed argon stored in the chamber 2 serves to more efficiently cool said generated gas, without producing said contaminates. Furthermore, since argon has a relatively low thermal conductivity (42.37 CDL/(sec)(cm$^2$)(°C/cm)$\times 10^{-6}$) as compared to nitrogen (62.40) or compressed air (62.20), heat added to the argon as a result of combination with generated gas is more concentrated in the argon and transmitted less to the air cushion which it inflates. Furthermore, since argon is relatively heavy per mol of inflating material (39.948) as compared to nitrogen (14) or air (14.5), the compressed argon in the cushion contributes to a plumper air cushion of greater mass, thus affording greater occupant protection.

Furthermore, argon has distinctive advantages over the other gas medias, such as air and nitrogen, in that because of its higher thermal capacity, the final temperature produced in the crash cushion is dramatically reduced when utilizing argon as a filling media. Argon also has an advantage in that its viscosity is higher than nitrogen or air, thereby causing the function of the dynamic air cushion to be of relatively non-linear nature in that the restraining loads placed on the occupants are not as directly proportional to penetration depth into the bag as with nitrogen.

The net advantages of these and other aforementioned advantages of argon are that the utilization of argon allows the production of an air bag system which utilizes a decreased amount of propellant thereby renering the bag cooler, less smokey, quieter, non-toxic, elatively non-linear dynamic response, and one that rovides more uniform characteristics over the appro-riate operational temperature range.

If desired, it is within the scope of this invention to ıclude within the vessel 2 a mixture of compressed he-um and compressed argon within the ratio of 90 per-ent Ar to 90 percent He in order to obtain the advan-ıges of argon set forth above with relative ease of leak hecking.

Furthermore, the lower thermal conductivity of rgon materially increases the very localized tempera-ıre of the mixing zone where the generated gases meet ıe stored gases in order to allow the combustion pro-ess of the generated gases to go to a more complete tate of reaction, thereby materially reducing the con-entration of carbonmonoxide produced by the infla-.on system and thereby allowing the chemistry of the ropellant to be placed at a more stoichiometric balance, which materially increases the reduction of other possible contaminates by the interaction of excessive oxidives which were heretofore necessary in order to reduce the CO (carbonmonoxide) level to acceptable values.

Having described the invention with relation to a specific embodiment shown in the drawing for purposes of illustration, we claim:

1. Inflatable gas bag system for protection of an occupant of a vehicle comprising inflatable cushion means and a source for providing inflating gas to said means, said source comprising (1) gas generating means for combustible material for supply of generated gas to said cushion means and (2) pressurized stored gas [consisting] *comprising essentially* [of] compressed argon gas, and further including means for at least partially intermixing said generated gas with said compressed argon gas.

* * * * *